United States Patent Office 3,813,303
Patented May 28, 1974

3,813,303
METHOD OF TREATING AN ALUMINUM SURFACE
Erich Hofling, Rudolf Baur, and Siegfried Bloeck, Kreuzlingen, Switzerland, assignors to Swiss Aluminium Ltd., Chippis, Switzerland
No Drawing. Filed Apr. 5, 1971, Ser. No. 241,406
Claims priority, application Switzerland, Apr. 14, 1971, 5,368/71
Int. Cl. C23f 7/14
U.S. Cl. 148—6.15 R                7 Claims

ABSTRACT OF THE DISCLOSURE

Aluminum surfaces which are covered with a coating or an adhesive layer of a hardenable synthetic resin are pretreated in an aqueous solution containing an alkali pyrophosphate and/or an alkali tripolyphosphate and an alkali nitrite.

---

In the application of lacquers, coatings and bonding materials to aluminum and aluminum alloys, and also in the manufacture of laminates consisting of layers of aluminum or aluminum alloy bonded to layers of synthetic resins, it is usually desirable to obtain a bond showing a high adhesion strength. Various attempts have been made to obtain a bond of high adhesion strength by pretreating the aluminum surface before applying the coating, or the adhesive. For example special adhesives may be used, or the aluminum surface may be degreased by one method or another. The aluminum surface also may be etched, or a layer of oxide may be formed on it either by chemical reaction or by anodizing. However, these processes are often costly and require long treatment periods. In some cases the aluminum surface needs a special degreasing, in order to obtain satisfactory results. Reaction layers are also known containing hexavalent chromium. These layers have been proposed as priming layers for lacquer. However, coating substances containing hexavalent chromium are not permitted on aluminum strip used as material for containers for the foodstuff industry. It is therefore desirable to develop a suitable, simpler and less costly pretreating process.

Further important criteria for the synthetic resin layers, besides adhesive strength, are resistance to corrosion, resistance to solvents and general chemical stability.

The present invention concerns a method of treating aluminum surfaces in a hot, layer-forming aqueous solution before applying the coatings or adhesive layers made of hardenable synthetic resins. The method according to the invention is characterized in that the aqueous solution contains 0.5 to 5%, preferably 1 to 3%, of alkali pyrophosphate or alkali tripolyphosphate or a mixture thereof, together with 0.04 to 3%, preferably 0.1 to 1%, of alkali nitrite.

Solutions containing phosphates are known as degreasing agents for metal surfaces. It has now surprisingly been found that if the metal surface is treated with a pyrophosphate and/or a tripolyphosphate, together with a nitrite, there is obtained, in addition to the expected degreasing effect, also improved adhesive strength and higher corrosion resistance of the coating or the adhesive. In particular the resistance of the coating or layer of adhesive to solvents is improved. The improvements in these properties are due to a better hardening of the coating or layer of adhesive, due to the fact that the layer hardens more rapidly and/or becomes more highly polymerized if the aluminum surface has been pretreated in an aqueous solution containing pyrophosphate and/or tripolyphosphate together with nitrite. For example, the surprising discovery has been made that in epoxy resin lacquers hardened with dicyandiamide more dicyandiamide has reacted, and that a higher adhesion strength and greater chemical stability are the result if the aluminum surface has been pretreated according to the present invention, compared to what is obtained by using other solutions which do not contain nitrite. A pretreatment according to the invention is not costly.

A pretreatment method according to the invention is suitable for use with hardenable 1-component and 2-component synthetic resin systems, particularly epoxy and epoxy-phenol resin systems. In particular, after treatment according to the invention, the surface may be coated with an epoxy-phenol resin lacquer, or with an epoxy resin adhesive, or with a 2-component epoxy-system, the hardener being a monomeric amine, amide or polyamine. A method according to the invention can also be employed for coatings and adhesives which are hardenable in the cold, as for example, the epoxy resin adhesive Araldite A.V. 138, or also cold-hardening polyurethane resins. The method, in comparison with known etching methods which employ chromic acid solutions (pickling), also exhibits various further advantages, for the latter require longer etching periods, produce dangers in handling the etching solutions, and produce great problems with regard to disposal of waste water.

In a method according to the invention there is formed on the aluminum surface a layer containing aluminum hydroxide and aluminum phosphate. The pretreatment may be conducted at 50 to 100° C., preferably 65 to 95° C., and continued for a period between 5 and 240 seconds, preferably between 15 and 60 seconds. If the pretreatment is continued for too long, excessively thick layers are formed which have a tendency to flake off. After the pretreatment, the resulting surface is rinsed with salt-free water, and is dried. The alkali salts of the pyrophosphate and tripolyphosphate are preferably sodium and ammonium salts.

The pretreatment solution may contain other substances, for example other phosphates which have a degreasing action. However a tripolyphosphate-pyrophosphate-nitrite solution itself has a degreasing effect and it is not always necessary to apply a separate degreasing.

The following examples illustrate the nature of the improvements which can be obtained using a pretreatment method according to the invention.

EXAMPLE 1

Samples of aluminum strip containing 98.75% Al were coated, after various pretreatments, with 2 mg./dm.$^2$ of an epoxy resin (Araldite AZ 15) ("Araldite" is a Registered Trademark). The resin was hardened with dicyandiamide (10% based on the epoxy resin) during 30 minutes at 200° C. The dicyandiamide was a product marked with radioactive C 14. In the hardened coating, the concentration of dicyandiamide which had reacted and remained bound in the coating was calculated from activity measurements, to provide a measure for the degree of hardening or polymerization (lattice formation) obtained. The following data indicate, on the one hand, the nature of the pretreatment, and on the other hand the fraction of the dicyandiamide which has reacted in the coating, expressed as percent of the initial quantity:

|   | Percent |
|---|---|
| (1) Annealed after rolling, dicyandiamide | 13 |
| (2) Aluminum strip degreased with a degreasing agent containing phosphate and borax | 12 |
| (3) Etched in a dilute solution containing chromic and sulphuric acids (pickling), 10 min. 75° | 14 |
| (4) Degreased by the method of (2) above and then treated for 1 minute in a Na-tripolyphosphate solution at 80° | 13 |
| (5) Treated for 1 minute at 80° C. in a solution containing 1% of Na-pyrophosphate+0.5% $NaNO_2$ | 22 |
| (6) Treated for 1 minute at 80° C. in a solution contion containing 1% of Na-tripolyphosphate+0.5% $NaNO_2$ | 23 |
| (7) Treated for 2 minutes at 70° C. in a solution containing 1.2% Na-pyrophosphate, 0.2% Na-tripolyphosphate+1.4% $NaNO_2$ | 27 |

From these results it will be seen that, on the basis of the higher residual fraction of dicyandiamide, a more fully hardened coating is obtained if the aluminum strip has been pretreated according to the invention with pyrophosphate, or tripolyphosphate, and nitrite. Corresponding results were obtained under analogous conditions but with thicker coatings. With the thicker coatings it was also found that better hardening is obtained by pretreating the strip by a method according to the invention.

Experience with most lacquers has shown that a better hardening results in a greater resistance to solvents. It was found that, using other baked lacquers and adhesives, for example based on epoxy-phenol resins, aluminum pretreated by a method according to the invention gives the produce a higher resistance against solvents, compared to aluminum pretreated by other methods, or not pretreated at all. It must be concluded that pretreatment according to the invention results in general in a better hardening of the resin.

EXAMPLE 2

Samples of a sheet material made of an aluminum-manganese alloy were pretreated for 60 seconds at 80° C. in various aqueous solutions, after which they were coated with 6 g./m.² of an epoxy-phenol resin (food-canning gold lacquer), and then baked for 5 minutes at 250° C. The following two tests were made on the samples:

A. A test for porosity of the lacquer coating was made by immersing deep drawn cups in a solution of copper sulphate. Copper becomes visibly deposited in the pores.

B. The lacquer coating was tested for swelling, by boiling the samples in a solution containing 250 ml. of isopropanol, 250 ml. of trichloroethylene and 0.5 ml. hydrochloric acid.

The following table shows, next to the nature of the pretreatment, visual evaluations of coating quality, in which 0=very good, 1=good, 2=mediocre and 3=bad.

|   | Test A | Test B |
|---|---|---|
| 1. Rolled blank | 3 | 3 |
| 2. Na-tripolyphosphate 1% | 2 | 1 |
| 3. Na-tripolyphosphate 1% plus $NaNO_2$ 0.5% | 1 | 0 |
| 4. Na-tripolyphosphate 1% plus $NaNO_2$ 2% | 0 | 0 |
| 5. Na-pyrophosphate 1% | 2 | 3 |
| 6. Na-pyrophosphate 1% plus $NaNO_2$ 1% | 0 | 0 |
| 7. Na-dihydrogenphosphate plus $NaNO_2$ 1% | 3 | 3 |

These results show that the only lacquer coatings free from pores and resistant to swelling (Tests 3, 4 and 6) were those applied after pretreating the Al-Mn with tripolyphosphate or pyrophosphate, together with nitrite.

Using either of these two phosphates only, without nitrite, gave worse results. Using other phosphates, even together with nitrite, gave worse results. It must be concluded that pretreating the metal surface by a method according to the invention improves the wetting properties of the metal surface with respect to the lacquer. The results of the B test show the improved hardening of the lacquer provided by a pretreatment according to the invention.

EXAMPLE 3

Samples of a pure aluminum sheet material were given various preliminary treatments and then coated with 6 g./m.² of an epoxy-phenol resin lacquer (Wiederhold 48161 lacquer). The coated samples were baked for 4 minutes at 250° C. After cooling, the adhesion strength of the bond between the lacquer and the aluminum surface was measured, by peeling the lacquer coating off, with the help of a tab of polyamide foil (Rilsan-11) hot sealed to the lacquer coating. The tabs were 15 mm. wide. The strength required to pull the tabs off was measured for each sample. It was found that 3.5 to 4.4 kp. was required to pull the lacquer off the samples in which the aluminum had been pretreated by the process according to the invention (1 minute at 80° C. in an aqueous solution containing 1% Na-tripolyphosphate or 1% Na-pyrophosphate, and 0.5% $NaNO_2$). On the other hand only approximately 2 kp. was required in the case of the samples in which the aluminum had merely been degreased in the conventional manner, without any nitrite.

These examples show that a pretreatment according to the invention increases the adhesion strength of the bond between aluminum and hot-hardening synthetic resin lacquers, compared to lacquered aluminum surface merely degreased in the conventional manner.

EXAMPLE 4

Samples of a conventional AlMgCu alloy used for adhesion-bonded structural parts were pretreated by various methods. The pretreated samples were then bonded together using an epoxy resin adhesive (Araldite AZ 15). The bond was hardened for 3 hours at 160° C. under a pressure of 1 kp./cm.². Some of the samples were tested for adhesion strength immediately, by a shear-tension test. Other samples were first kept in a tropical climate for 3 weeks (38–40° C., approximately 95% relative moisture), and then tested by the shear-tension test. The following results show the superiority of the bond produced when the sheet material has been pretreated by a method according to the invention.

|   | Shear-tension test (kp./cm.²) | |
|---|---|---|
|   | Immediately | After tropical storage |
| 1. Degreased in a degreasing medium containing phosphate and borax. Treatment in 1% Na-tripolyphosposate, 80° C., 15 seconds | 260 | 204 |
| 2. Degreased as described under 1 above. Treatment in 1% Na-tripolyphosphate plus 1% Na-nitrite | 320 | 260 |

What we claim is:

1. A method of treating an aluminum surface to make it suitable to receive a coating or an adhesive layer of a hardenable synthetic resin, consisting essentially of applying to the surface an aqueous solution containing 0.5 to 5.0% of alkali pyrophosphate, or of alkali tripolyphosphate, or of a mixture thereof, and containing 0.04 to 3.0% of alkali nitrite.

2. A method according to claim 1, in which the solution used contains 1.0 to 3.0% of alkali pyrophosphate, or of alkali tripolyphosphate, or of a mixture thereof.

3. A method according to claim 1, in which the solution used contains 0.1 to 1.0% of alkali nitrite.

4. A method according to claim 1, in which the solution is applied at 50° to 100° C., for 5 to 240 seconds.

5. A method of coating an aluminum surface in which the surface is treated by a method according to claim 1, and then is coated with an epoxy-phenol resin lacquer.

6. A method of coating an aluminum surface in which the surface is treated by a method according to claim 1, and then is coated with an epoxy resin adhesive.

7. A method of coating an aluminum surface in which the surface is treated by a method according to claim 1, and then is coated with a 2-component epoxy system, the hardener being a monomeric amine, amide or polyamine.

References Cited
UNITED STATES PATENTS

| | | | |
|---|---|---|---|
| 2,856,322 | 10/1958 | Parson et al. | 148—6.15 R |
| 2,891,884 | 6/1959 | Rausch | 148—6.15 R |
| 2,987,428 | 6/1961 | Heller | 148—6.15 R |
| 3,429,945 | 2/1969 | Forsberg et al. | 148—6.27 X |
| 3,533,859 | 10/1970 | Engesser et al. | 148—6.15 Z |
| 3,713,904 | 1/1973 | Bernath et al. | 148—6.27 X |

RALPH S. KENDALL, Primary Examiner

U.S. Cl. X.R.

148—6.27